(12) United States Patent
Ono et al.

(10) Patent No.: US 8,783,207 B2
(45) Date of Patent: Jul. 22, 2014

(54) METER POINTER DEVICE

(75) Inventors: Haruyoshi Ono, Shimada (JP); Atsushi Yoshimura, Shimada (JP)

(73) Assignee: Yazaki Corporation, Tokyo (JP)

( * ) Notice: Subject to any disclaimer, the term of this patent is extended or adjusted under 35 U.S.C. 154(b) by 361 days.

(21) Appl. No.: 13/064,305

(22) Filed: Mar. 17, 2011

(65) Prior Publication Data

US 2011/0232563 A1 Sep. 29, 2011

(30) Foreign Application Priority Data

Mar. 23, 2010 (JP) .................................. 2010-065640

(51) Int. Cl.
*G01D 13/26* (2006.01)
*G01D 11/28* (2006.01)

(52) U.S. Cl.
USPC .................... 116/286; 116/DIG. 6; 362/23.21

(58) Field of Classification Search
CPC ....... G01D 11/28; G01D 13/22; G01D 13/26; G01D 13/265; G01D 13/28; G12B 11/00; G12B 11/02; G12B 11/04; B60K 35/00; B60K 37/02
USPC .................... 116/284, 286, 287, 288, DIG. 6, 116/DIG. 36; 340/815.78; 362/23.21
See application file for complete search history.

(56) References Cited

U.S. PATENT DOCUMENTS

| 4,163,428 | A | * | 8/1979 | Ishikawa | 116/288 |
| 5,050,045 | A | * | 9/1991 | Kato et al. | 362/23 |
| 5,142,453 | A | * | 8/1992 | Ohta et al. | 362/29 |
| 5,372,087 | A | * | 12/1994 | Kato et al. | 116/288 |
| 5,630,373 | A | * | 5/1997 | Kato et al. | 116/288 |
| 5,806,954 | A | * | 9/1998 | Butt et al. | 362/26 |
| 6,082,288 | A | * | 7/2000 | Kato et al. | 116/286 |
| 6,314,908 | B1 | * | 11/2001 | Olbrich et al. | 116/288 |
| 6,408,783 | B1 | * | 6/2002 | Ludewig | 116/288 |
| 6,606,961 | B1 | * | 8/2003 | Noll et al. | 116/288 |
| 7,984,688 | B2 | * | 7/2011 | Fournier | 116/288 |
| 2008/0022570 | A1 | * | 1/2008 | Kageyama et al. | 40/541 |
| 2010/0007509 | A1 | | 1/2010 | Ono | |
| 2010/0263584 | A1 | * | 10/2010 | Suss | 116/288 |

FOREIGN PATENT DOCUMENTS

| DE | 3837295 | A1 | * | 5/1990 | G01D 11/28 |
| DE | 4432274 | A1 | * | 3/1996 | G01R 1/04 |
| FR | 2829610 | A1 | * | 3/2003 | G12B 11/00 |
| JP | 07286868 | A | * | 10/1995 | G01D 13/28 |
| JP | 07306063 | A | * | 11/1995 | G01D 13/28 |

(Continued)

OTHER PUBLICATIONS

Office Action dated Nov. 1, 2013 in connection with corresponding Japanese Application No. 2010-065640, with English translation.

*Primary Examiner* — Richard A. Smith
(74) *Attorney, Agent, or Firm* — Edwards Wildman Palmer LLP; James E. Armstrong, IV; Carolina E. Save

(57) ABSTRACT

An electric wire for connecting a rotating base plate 18 and a main substrate 10 is composed of an FPC 13. The FPC is connected to the main substrate 10 in a manner that a width direction of the FPC 13 is perpendicular to the main substrate 10. A protecting member 14 is provided on the main substrate 10 for surrounding a moving range of the FPC 13 on the main substrate 10 associated with a rotation of a meter pointer 12.

3 Claims, 7 Drawing Sheets

(56) References Cited

FOREIGN PATENT DOCUMENTS

| | | | | | |
|---|---|---|---|---|---|
| JP | 08327412 | A | * | 12/1996 | ............. G01D 13/28 |
| JP | 2002357462 | A | * | 12/2002 | ............. G01D 13/28 |
| JP | 2005049104 | A | * | 2/2005 | ............. G01D 13/28 |
| JP | 2010-019619 | A | | 1/2010 | |

* cited by examiner

METER POINTER DEVICE

CROSS REFERENCE TO RELATED APPLICATIONS

This application is on the basis of Japanese Patent Application No. 2010-065640, the contents of which are hereby incorporated by reference.

BACKGROUND OF THE INVENTION

1. Field of the Invention

The present invention relates to a meter pointer device, in particular, a meter pointer device having a meter pointer, a motor for rotating the meter pointer, a main substrate disposed on a rear wall of the meter pointer on which the motor is mounted, a base plate to be rotated together with the meter pointer by the motor, a light source mounted on the base plate for emitting light to the meter pointer to illuminate the meter pointer, and an electric wire for connecting the base plate to the main substrate.

2. Description of the Related Art

A meter having a display device disposed at a front side of a dial plate is known. Owing to this layout, the display device can be seen without it being interrupted by a meter pointer, and the display device is disposed at the center of the dial plate.

However, in a case that the dial plate displays important data such as vehicle speed, and the display device displays relatively unimportant data such as the present time, there is a request that the dial plate is more front side than the display device to increase the visibility of the dial plate.

So, in response to the request, there is proposed a meter pointer device in which a tip of the meter pointer is folded toward a rotating shaft, and then folded back away from the rotating shaft, thereby the meter pointer can point the dial plate without interfering with the display device.

For illuminating such a meter pointer rotating around the rotating shaft, it is necessary to arrange LED light sources to surround the rotating shaft. Therefore, there is a problem that it is difficult to eliminate uneven illumination when the meter pointer is rotated. Further, it is necessary to provide many reflecting walls for guiding the light entered from the rotating shaft to a tip of the meter pointer so as to illuminate the meter pointer having such a complex shape. Therefore, there is a problem that an attenuation of the light is large and sufficient brightness cannot be attained.

So, for solving this problem, for example, a display device 100 with a meter pointer device shown in FIGS. 8 and 9 incorporated therein is proposed (Patent Document 1). As shown in these figures, the display device 100 includes: an LCD display 101; a dial plate 102, a main substrate 103; a motor 104; a meter pointer 105; and a lead wire 106. The LCD 101 displays data such as warning, current time, or the like.

Indication marks (for example, numbers) which the meter pointer 105 indicates are formed on a front side of the dial plate 102 by printing or the like. The main substrate 103 is disposed on a rear wall of the LCD 101. A motor main body 104A of the motor 104 is mounted on a rear wall of the main substrate 103, and a rotating shaft 104B of the motor 104 is projected toward a front side of the main substrate 103. The meter pointer 105 includes: a base plate 105A; an LED light source 105B; a pointer main body 105C; an attaching member 105D; and the like. The base plate 105A is attached to the rotating shaft 104B and extended outward in a radial direction of the rotating shaft 104B.

The LED light source 105B is mounted on a front side of the base plate 105A at an outer end in a radial direction of the base plate 105A. The LED light source 105B emits light forward. The pointer main body 105C is composed of light guiding members, and as shown in FIG. 8, formed by being extended vertically from an outside of the LCD 101, then folded toward the center of the dial plate 102 and extended to an inner periphery of the dial plate 102 via the LCD 101 and the dial plate 102, and then folded to a front side and extended to a front side of the dial plate 102, and folded back to the outside of the dial plate 102 to point a front wall of the dial plate 102. The attaching member 105D is fixed to the pointer main body 105C for attaching the pointer main body 105C to the base plate 105A.

According to the above-described display device 100, because the LED light source 105B is mounted on the base plate 105A which is fixed to the rotating shaft 104B, the LED light source 105B is rotated coincident with rotation of the meter pointer 105. Therefore, the uneven illumination of the meter pointer 105 when the meter pointer 105 is rotated can be eliminated. Further, as shown in FIG. 8, three reflecting walls M11, M12, and M13 reflects the light L from the LED light source 105B to guide the light L to the tip of the pointer main body 105C. Therefore, the number of reflection is reduced, and the brightness of the pointer main body 105C is increased.

The lead wire 106 is a wire for supplying electricity and connects the main substrate 103 to the base plate 105A around the rotating shaft 104B. The lead wire 106 is electrically connected to the base plate 105A by soldering. Owing to this lead wire 106, even when the base plate 105A is rotated, the electricity is supplied to the base plate 105A from the main substrate 103.

According to the above-described display device 100, the lead wire 106 is used as a wire connecting the main substrate 103 with the rotating base plate 105A. However, the lead wire 106 is hard to be deformed corresponding to the rotation of the meter pointer 105 (low mobility). Therefore, when the meter pointer 105 is rotated, stress is applied to a soldering portion (connection portion) between the lead wire 106 and the base plate 105A, and there is a worry that reliability may be reduced. Further, because the lead wire 106 is hard to be deformed, there is a worry that the lead wire 106 may be raised toward the meter pointer 105 corresponding to the rotation of the meter pointer 105 to disturb the rotation of the meter pointer 105.

So, as shown in FIG. 9, the lead wire 106 is caught between a regulator main body 107A of a regulator 107 and an arm 107B of the regulator 107 for preventing the lead wire 106 from being raised. However, when the regulator 107 is provided, a man-hour for attaching the lead wire 106 to the regulator 107 is needed. Further, when the regulator 107 is provided, there is a problem that the mobility of the lead wire 106 is further reduced, and more stress is applied to the soldering portion between the lead wire 106 and the base plate 105A when the meter pointer 105 is rotated.

[Patent Document 1] JP, A, 2010-19619

Accordingly, an object of the present invention is to provide a meter pointer device which prevents stress from being applied to a connecting portion between a rotating base plate and a wire to improve reliability, and prevents the wire from being raised even without a regulator to eliminate an attaching work of the wire to the regulator and to improve workability.

SUMMARY OF THE INVENTION

In order to attain the object, according to the present invention, there is provided a meter pointer device including:

a meter pointer having a light guiding pointer main body, a light source to emit light to the pointer main body for illuminating the pointer main body, and a base plate on which the light source is mounted;

a motor for rotating the meter pointer;

a main substrate disposed on a rear wall of the meter pointer and on which the motor is mounted; and an electric wire for connecting the base plate with the main substrate, the electric wire being composed of a flat circuit body, and one end of the flat circuit body being connected to the main substrate in a manner that a width direction of the flat circuit body is perpendicular to the main substrate.

Preferably, the meter pointer device further including a protecting member disposed on the main substrate for surrounding a moving range of the flat circuit body on the main substrate due to a rotation of the meter pointer.

Preferably, a first connecting portion for connecting to the main substrate is provided on one end in the width direction of the one end of the flat circuit body. Further, a projection projected toward the other end in the width direction and a second connecting portion formed on an end in a projecting direction of the projection for connecting to the base plate are provided on the other end of the flat circuit body.

Preferably, the other end of the flat circuit body is overlapped with one side wall in a thickness direction of the base plate and electrically connected to the base plate. Further, a continuous portion from the other end of the flat circuit body is overlapped with one side wall in a width direction of the base plate and the other side wall in a thickness direction of the base plate, and wound around them.

These and other objects, features, and advantages of the present invention will become more apparent upon reading of the following detailed description along with the accompanied drawings.

DETAILED DESCRIPTION OF THE PREFERRED EMBODIMENTS

Figure 1:
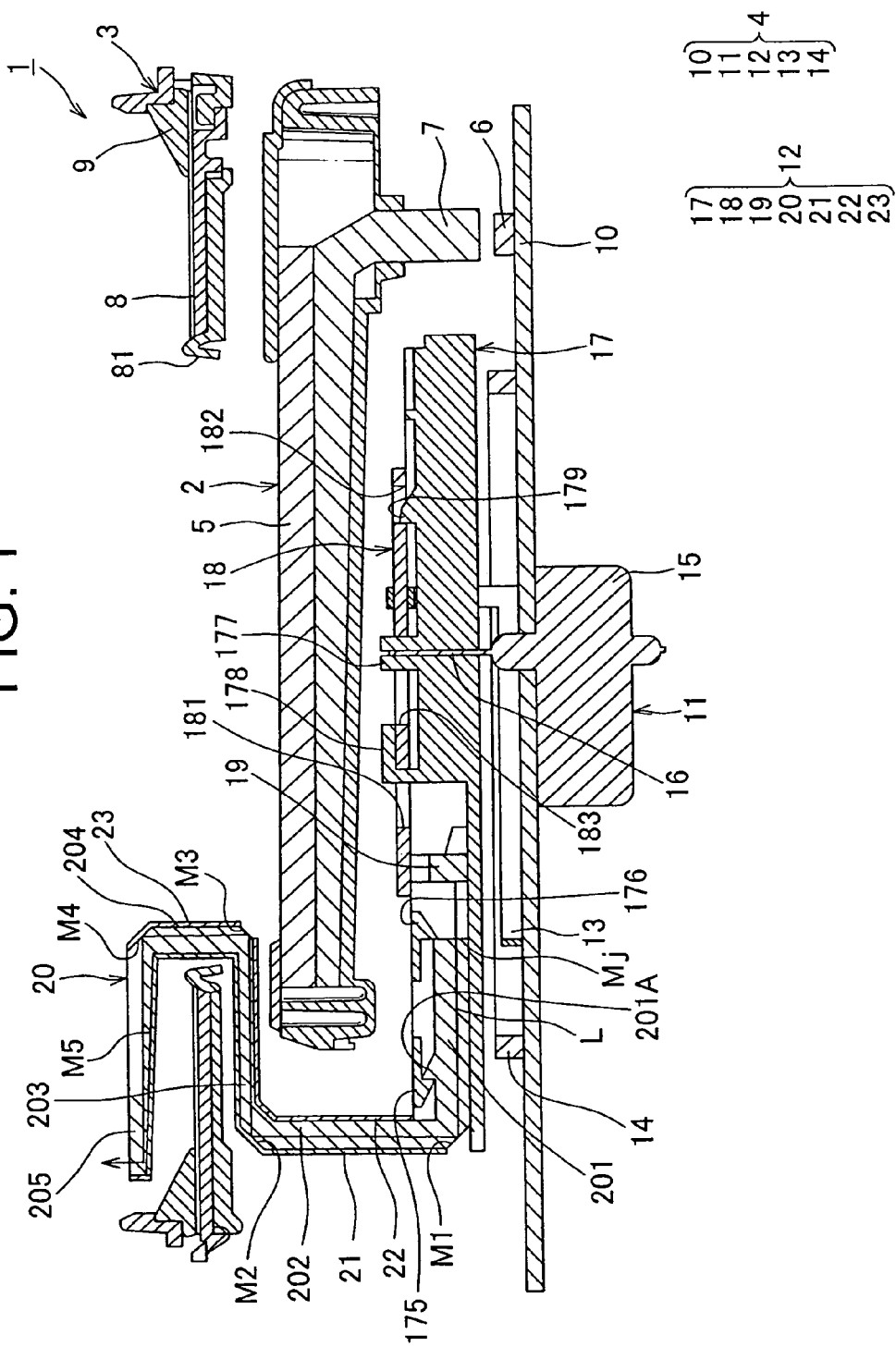
FIG. 1 is a sectional view showing one embodiment of a display devise incorporating a meter pointer display of the present invention.

Hereinafter, a display device incorporating a meter pointer device of the present invention will be explained with reference to FIGS. 1 to 6. As shown in FIGS. 1 to 6, the display device 1 includes: an LCD display 2; a dial plate 3; and a meter pointer device 4. As shown in FIG. 1, the LCD 2 is composed of an LCD main body 5, a backlight LED light source 6 mounted on a later-described main substrate 10, and a light guiding plate 7 for guiding the light emitted from the LED light source 6 to a rear wall of the LCD main body 5.

As shown in FIG. 1, the dial plate 3 includes: a character board 8; and a scale ring 9. The character board 8 is formed in a ring (arc) shape in a plan view, and a substantially circular hole 81 for exposing the LCD 2 is formed at the center of the character board 8. An index (for example, number) which a later-described meter pointer 12 indicates is formed at a front side of the character board 8 by printing or the like. The scale ring 9 is composed of a light guiding plate made of transparent resin or the like, and formed in a ring (arc) shape to cover an outer peripheral edge at the front side of the character board 8. A concave scale is formed on a front side of the scale ring 9. The dial plate 3 is disposed at a front side of the LCD 2 to allow the LCD 2 to be seen in front view via the substantially circular hole 81 formed on the character board 8.

The meter pointer device 4 includes: the main substrate 10; a motor 11; the meter pointer 12; an FPC (Flexible printed circuits) 13 as an electric wire; and a protecting member 14. The main substrate 10 is disposed on a rear wall of the LCD 2. The motor 11 includes: a motor main body 15; and a rotating shaft 16. The motor main body 15 is disposed on a rear wall of the main substrate 10. The rotating shaft 16 is projected toward a front side of the main substrate 10.

The meter pointer 12 includes: a long base portion 17 fixed to the rotating shaft 16 of the motor 11 and extending along a radial direction of the rotating shaft 16; a base plate 18 fixed to a front wall of the base portion 17; an LED light source 19 mounted on a rear side of the base plate 18 and emitting light L toward an outside in the radial direction of the rotating shaft 16; a pointer main body 20; and a light leakage preventing cover 21, 22, 23.

First, the above-described pointer main body 20 will be explained. The pointer main body 20 is integrally composed of bar-shaped first member 201, second member 202, third member 203, fourth member 204, and pointer member 205 made by light guiding material such as transparent resin. One end of the first member 201 faces the LED light source 19, and the other end of the first member 201 is extended to an outside of an outer side wall of the LCD 2 in a radial direction. Further, the first member 201 is mounted on and fixed to the base portion 17.

Figure 4:
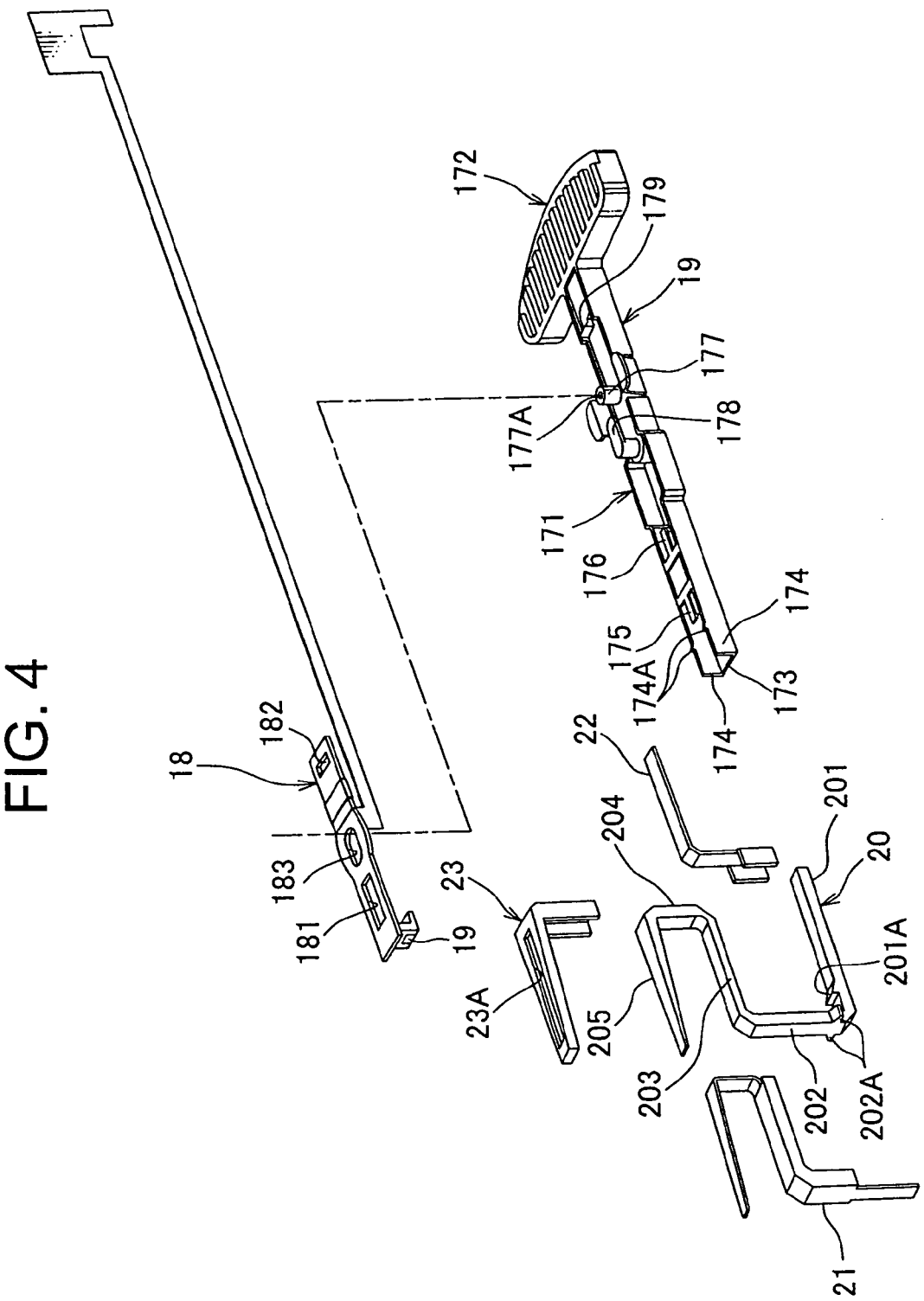
FIG. 4 is an exploded perspective view of the meter pointer device shown in FIGS. 2 and 3.

Further, as shown in FIG. 4, a locking projection 201A projected toward a front side is formed on the first member 201. This locking projection 201A is locked with the later-described base portion 17. A tapered wall approaching the rear wall as the locking projection 201A is extended toward an inside in a radial direction is formed on the locking projection 201A.

Figure 2:
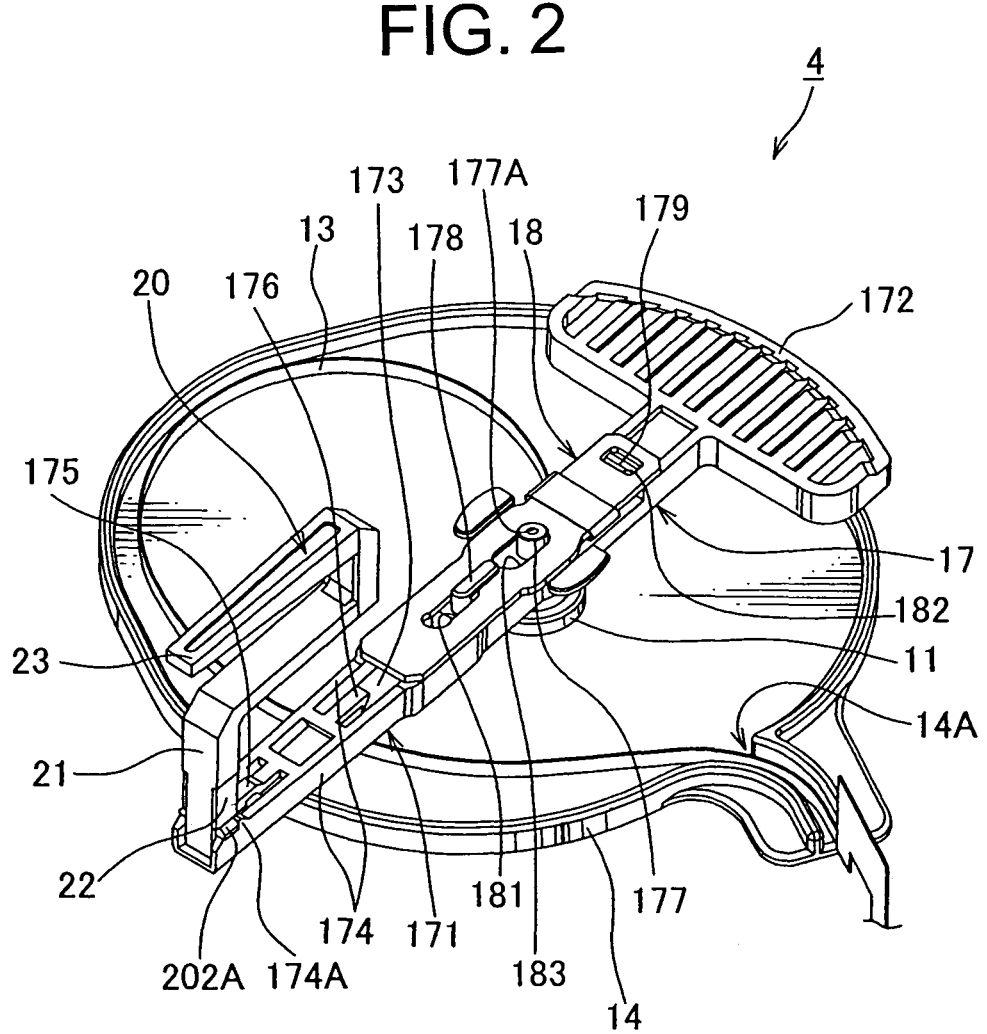
FIG. 2 is a perspective view showing that a meter pointer composing the meter device shown in FIG. 1 indicates the minimum value.

As shown in FIG. 1, the second member 202 is extended vertically from the other end of the first member 201 to a front side over the LCD 2 and to a rear side of the dial plate 3. As shown in FIG. 2, a pair of locking projections 202A projected in a width direction is formed on both side walls of the second member 202. This pair of locking projections 202A is locked with later-described locking projections 174A.

As shown in FIG. 1, the third member 203 is extended from an end at a front side of the second member 202 toward an inside in a radial direction over an inner side wall of the dial plate 3. The fourth member 204 is extended vertically from an inside end in a radial direction of the third member 203 to a front side over the dial plate 3. The pointer member 205 is extended from an end at a front side of the fourth member 204 to an outside in a radial direction, and indicates on the dial plate 3.

Further, the pointer main body 20 is provided with a first reflecting wall M1, a second reflecting wall M2, a third reflecting wall M3, a fourth reflecting wall M4, and a pointer reflecting wall M5. As shown in FIG. 1, the first reflecting wall M1 is disposed at an outside end in a radial direction of the first member 201, and faces a light receiving wall Mj. The first reflecting wall M1 is formed in a tapered shape approaching a front side as extending toward an outside in a radial direction so as to allow the light L traveling toward an outside in a radial direction within the first member 201 to be reflected toward a front side and guided within the second member 202.

The second reflecting wall M2 is disposed at a front side end of the second member 202, and faces the first reflecting wall M1. The second reflecting wall M2 is formed in a tapered shape approaching a front side as extending toward an inside in a radial direction so as to allow the light L traveling toward the front side within the second member 202 to be reflected toward an inside in a radial direction and guided within the third member 203. The third reflecting wall M3 is disposed at an inside end in a radial direction of the third member 203, and faces the second reflecting wall M2. The third reflecting wall M3 is formed in a tapered shape approaching a front side as extending toward an inside in a radial direction so as to allow the light L traveling toward an inside in a radial direction within the third member 203 to be reflected toward a front side and guided within the fourth member 204.

The fourth reflecting wall M4 is disposed at a front side end of the fourth member 204, and faces the third reflecting wall M3. The fourth reflecting wall M4 is formed in a tapered shape approaching a front side as extending toward an outside in a radial direction so as to allow the light L traveling toward the front side within the fourth member 204 to be reflected toward an outside in a radial direction and guided within the pointer member 205. The pointer reflecting wall M5 is formed in a tapered shape approaching a front side as extending toward an outside in a radial direction and disposed on a rear wall of the pointer member 205. The light L traveling toward an outside in a radial direction within the pointer member 205 is reflected on the pointer reflecting wall M5 and projected from a front wall of the pointer member 205.

According to the above structure, the light L emitted from the LED light source 19 is projected toward the outside in the radial direction, and guided within the pointer main body 20 from the light receiving wall Mj, and traveling toward the outside in the radial direction in the first member 201, then reflected on the first reflecting wall M1 to travel toward the front side in the second member 202. The light L traveling toward the front side in the second member 202 is reflected on the second reflecting wall M2, and travels toward the inside in the radial direction in the third member 203, and then is reflected on the third reflecting wall M3 to travel toward the front side in the fourth member 204. The light L traveling toward the front side in the fourth member 204 is reflected on the fourth reflecting wall M4 and travels toward the outside in the radial direction in the pointer member 205. The light L traveling toward the outside in the radial direction of the pointer member 205 is reflected on the pointer reflecting wall M5 and projected from the front wall of the pointer member 205. In this manner, in a front view, a front wall of the pointer member 205 is illuminated.

Further, the above-described pointer main body 20 is provided with the light leakage preventing covers 21, 22, 23. The light leakage preventing covers 21, 22, 23 are so provided as to cover surfaces of the pointer main body 20 except the front wall of the pointer member 205.

Figure 3:
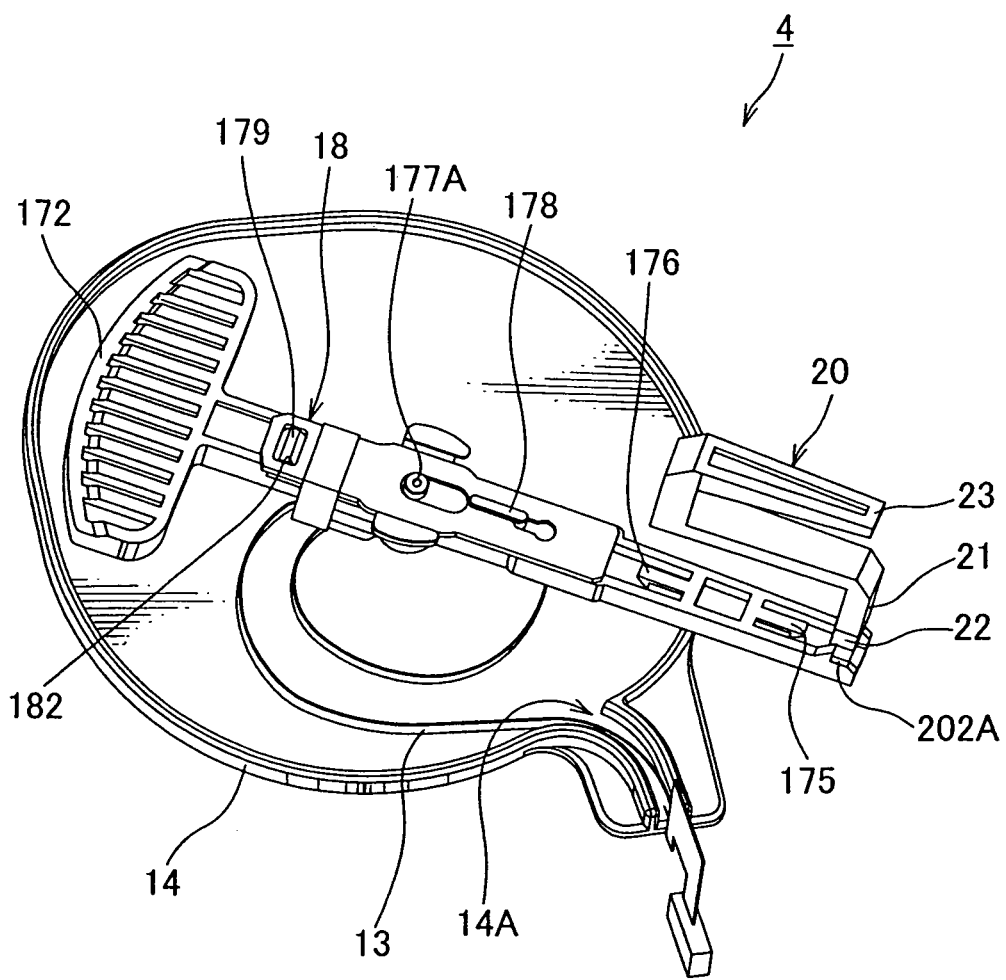
FIG. 3 is a perspective view showing that the meter pointer composing the meter device shown in FIG. 1 indicates the maximum value.

Next, the base portion 17 will be explained. As shown in FIG. 1, the base portion 17 is made of synthetic resin or the like, and formed in a long shape along the character board 8. As shown in FIGS. 2 to 4, the base portion 17 is integrally provided with an attaching portion 171 to which the pointer main body 20 and the later-described base plate 18 are attached, and a balance weight portion 172.

The attaching portion 171 is formed in a gutter shape, and provided with a bottom wall portion 173 on which the first member 201 is mounted, and a pair of vertical wall portions 174 extended vertically from both edges in a width direction of the bottom wall portion 173 to position the first member 201 therebetween. A side of the bottom wall portion away from the balance weight portion 172 is formed thin, and the side of the bottom wall portion 173 near the balance weight portion is formed thick.

Further, a pair of arms 175, 176 is arranged along a radial direction of the attaching portion 171. In the arm 175 disposed at an outside in the radial direction, an inside end in the radial direction is a fixed end fixed to the pair of vertical wall portions 174, and an outside end in the radial direction is a free end bendable in an axial direction. On the other hand, in the arm 176 disposed at an inside in the radial direction, an outside end in the radial direction is a fixed end fixed to the pair of vertical wall portions 174, and an inside end in the radial direction is a free end bendable in the axial direction.

Further, locking claws projected toward the rear wall are respectively formed on the free ends of the pair of arms 175, 176. These locking claws are respectively locked with the locking projection 201A formed on the pointer main body 20, and the light receiving wall Mj of the pointer main body 20. Tapered walls approaching the rear walls as approaching each other are respectively formed on the locking claws of the arms 175, 176. This pair of arms 175, 176 is formed on the thin bottom wall portion 173. Further, as shown in FIG. 2, a pair of locking projections 174A projected toward the front side for locking with the locking projections 202A of the pointer main body 20 is formed on the pair of vertical wall portions 174.

According to the above structure, as shown in FIG. 1, when the end of the first member 201 at the light receiving wall Mj side is overlapped with the bottom wall portion 173 from the outside in the radial direction of the base portion 17 and slid toward the inside in the radial direction, the locking projection 201A formed on the pointer main body 20 is locked with the arm 175 formed on the base portion 17, and the light receiving wall Mj of the pointer main body 20 is locked with the arm 176 formed on the base portion 17. Further, at this time, as shown in FIG. 2, the locking projections 174A formed on the vertical wall portions 174 and the locking projections 202A formed on the second member 202 are locked with each other to attach the pointer main body 20 to the base portion 17.

Further, as shown in FIGS. 1 to 4, a shaft portion 177 is projected from a front side of the thick bottom wall portion 173. A press-fitting hole 177A penetrating the bottom wall portion 173 is formed on the shaft portion 177. By press-fitting the rotating shaft 16 of the motor 11 into the press-fitting hole 177A, the base portion 17 is attached to the rotating shaft 16 of the motor 11. Further, a pair of locking projections 178, 179 as the first locking portions is arranged with a gap in the radial direction at the font side of the thick bottom wall portion 173. The shaft portion 177 is interposed between the pair of locking projections 178, 179.

As shown in FIGS. 2 and 3, the balance weight portion 172 is projected from both ends in a width direction of the base portion 17. This balance weight portion 172 is a weight for balancing the weights of a later-described base plate 18, the LED light source 19, and the pointer main body 20 applying to the rotating shaft 16.

The base plate 18 is composed of, for example, HPC (paper phenol substrate, glass composite substrate) on which the LED light source 19 is mounted. As the base plate 18, a double-sided board can be used for preventing the heat deformation, and a low-cost single-sided board can be used. Further, for example, by providing a heat deformation preventing film (not shown) such as curing adhesive or thin coating on an end wall (side wall) of the base plate 18, the heat deformation of the base plate 18 is prevented. The LED light source 19 is packaged on a rear wall of the base plate 18.

As shown in FIGS. 2 to 4, the base plate 18 is provided with a pair of locking holes 181, 182 as the second locking portions for respectively locking with the locking projections 178, 179, and a shaft-insertion hole 183 into which the shaft portion 177 is inserted. According to the above structure, as shown in FIG. 1, when the locking projection 178 formed on the base portion 17 is inserted into the locking hole 181 formed on the base plate 18 and locked together, and the locking projection 179 formed on the base portion 17 is inserted into the locking hole 182 formed on the base plate 18, the base plate 18 is attached to the front side of the base portion 17.

Figure 5:
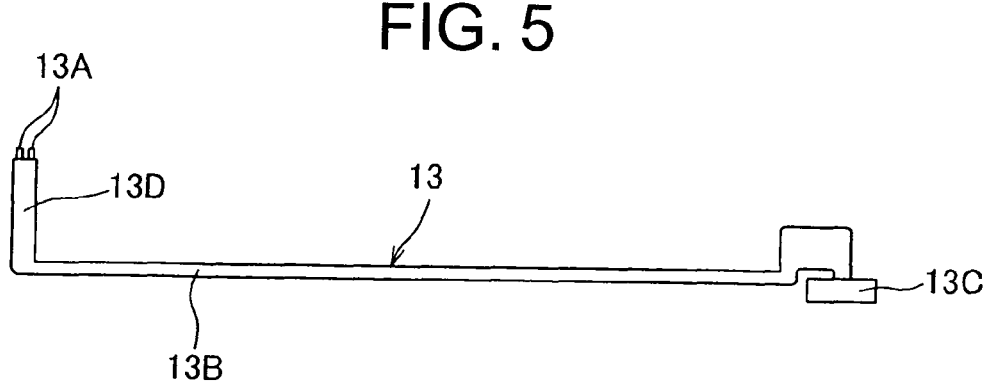
FIG. 5 is a developed view of an FPC shown in FIG. 1.

The FPC 13 is an electric wire for power supply connected between the main substrate 10 and the base plate 18. As shown in FIG. 5, the FPC 13 is a band-shaped flat circuit body composed of a pair of band-shaped conductors 13A, and an insulating sheet 13B. As shown in FIGS. 2 and 3, one end of the FPC 13 is connected to the main substrate 10 in a manner that a width direction of the FPC 13 is perpendicular to the main substrate 10.

For details, as shown in FIG. 5, a connector 13C as a first connecting portion connected to the main substrate 10 is provided on one side in a width direction of the FPC 13. Further, a projection 13D projected toward the other side in a width direction is formed on the other end of the FPC 13. The insulating sheet is removed at an end in a projection direction of the projection 13D, and inner conductors 13A are exposed. The conductor 13A exposed from the end of the projection 13D is a second connecting portion connected to the base plate 18.

Figure 6:
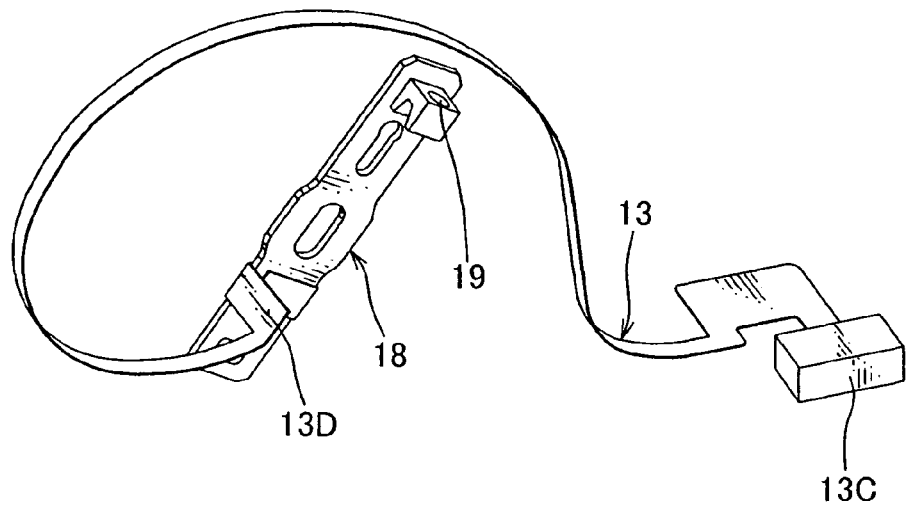
FIG. 6 is a perspective view of the FPC and a base plate shown in FIG. 1.

Further, as shown in FIG. 6; the other end of the projection 13D is overlapped with a rear wall of the base plate 18, and the conductor 13A exposed from the tip of the projection 13D is soldered and electrically connected to the base plate 18. Further, the portions continued from the other end of the projection 13D are respectively overlapped with one side wall in a width direction of the base plate 18, a front wall of the base plate 18, and the other side wall in the width direction of the base plate 18, thereby the projection 13D is wound around the base plate 18. Therefore, the FPC 13 is extracted from the other side in the width direction of the base plate 18. Further, the overlapped portion of the FPC 13 overlapped with the front wall of the base plate 18 is bonded to the base plate 18 with a not-shown adhesive.

As shown in FIGS. 2 and 3, the protecting member 14 is made of resin or the like, and formed in a ring shape at a front side of the main substrate 10. The protecting member 14 is so formed as to surround the moving range of the FPC 13 on the main substrate 10 due to the rotation of the meter pointer 105. For preventing from interfering with the FPC 13, electric components are not provided on a portion surrounded by the protecting member 14 on the main substrate 10. An opening 14A is provided on the ring shaped protecting member 14. An end of the FPC 13 is extracted from the opening 14A, and connected to the main substrate 10.

According to the above-described display device 1, the electric wire is composed of the FPC 13, and one end of the FPC 13 is connected to the main substrate 10 in a manner that a width direction of the FPC 13 is perpendicular to the main substrate 10. Therefore, because the FPC 13 can be easily deformed corresponding to the rotation of the base plate 18, a stress for spoiling the reliability is prevented from applying to the connecting portion between the base plate 18 and the FPC 13. Further, because the FPC 13 can be easily deformed corresponding to the rotation of the base plate 18, the FPC 13 is prevented from being raised up corresponding to the rotation of the base plate 18. Therefore, it is unnecessary to provide a regulator like a conventional display device, and an attaching work of the regulator to the FPC 13 becomes unnecessary. Therefore, the reliability of the connecting portion between the base plate 18 and the FPC 13 is improved and the workability is improved.

Further, according to the above-described display device 1, by providing the protecting member 14, the electric wire is prevented from moving to an outside of the protecting member 14. Therefore, the electronic components on the main substrate 10 and the electric wire are prevented from interfering with each other.

Further, according to the above-described display device 1, the connector 13C connected to the main substrate 10 is provided on one side in a width direction of the FPC 13, and the projection 13D projected toward the other side in a width direction, and the conductor 13A exposed at the end in the projection direction of the projection 13D to be connected to the base plate 18 are provided on the other end of the FPC 13. Therefore, the main substrate 10 and the base plate 18 can be connected to each other without twisting the FPC 13. Therefore, the reliability of the connecting portion between the base plate 18 and the FPC 13 is further improved.

Further, according to the above-described display device 1, the end of the projection 13D is overlapped with the front wall of the base plate 18 and electrically connected to the base plate 18, and the portions continued from the other end of the projection 13D are respectively overlapped with one side wall in a width direction of the base plate 18, a front wall of the base plate 18, and the other side wall in the width direction of the base plate 18, thereby the projection 13D is wound around the base plate 18. Therefore, because the FPC 13 is wound around the base plate 18, the FPC 13 is prevented from twisting upon the rotation of the base plate 18. Further, the stress generated between the base plate 18 and the FPC 13 upon the rotation of the base plate 18 is prevented from directly applying to the connecting portion between the base plate 18 and the FPC 13. Therefore, the reliability of the connecting portion between the base plate 18 and the FPC 13 is further improved.

Further, according to the above-described display device 1, the overlapping part of the FPC 13 with the rear wall of the base plate 18 is bonded to the base plate 18 with an adhesive. Therefore, the stress applied to between the base plate 18 and the FPC 13 upon the rotation of the base plate 18 is absorbed by a bonded portion with the adhesive. Therefore, the reliability of the connecting portion between the base plate 18 and the FPC 13 is further improved.

Figure 7:
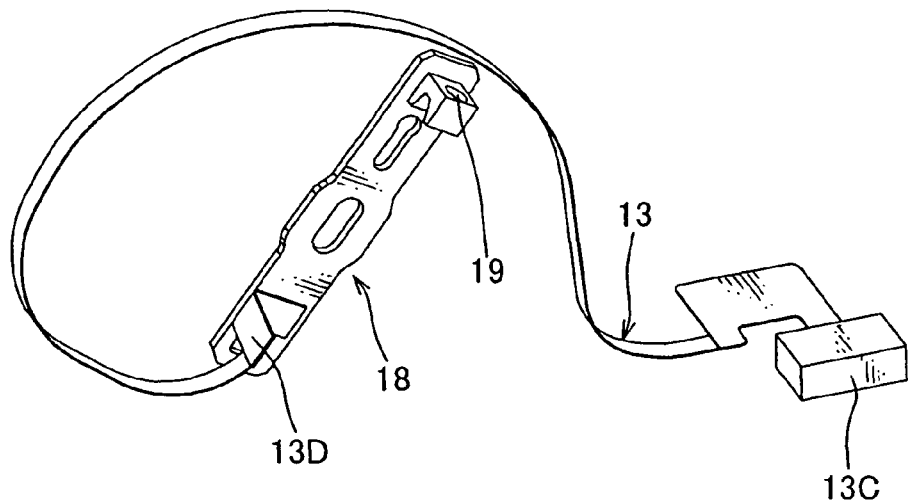
FIG. 7 is a perspective view of the FPC and the base plate according to another embodiment.

Incidentally, according to the above-described embodiment, as shown in FIG. 6, the projection 13D of the FPC 13 is wound around the base plate 18. However, the present invention is not limited to this. For example, as shown in FIG. 7, the end of the projection 13D of the FPC 13 may be merely overlapped with the rear wall of the base plate 18, and electrically connected to the base plate 18. Further, the portion continued to the end may be extracted from one side in the width direction of the base plate 18. However, in this case, the FPC 13 is twisted due to the rotation of the base plate 18, and there is a fear that the stress is generated at the soldering portion (connecting portion). Resultingly, the soldering portion may be removed and the contact failure may be generated between the FPC 13 and the base plate 18 so that the LED light source 19 may not light up. Therefore, preferably, as shown in 6, the projection 13D of the FPC 13 is wound around the base plate 18.

Figure 8:
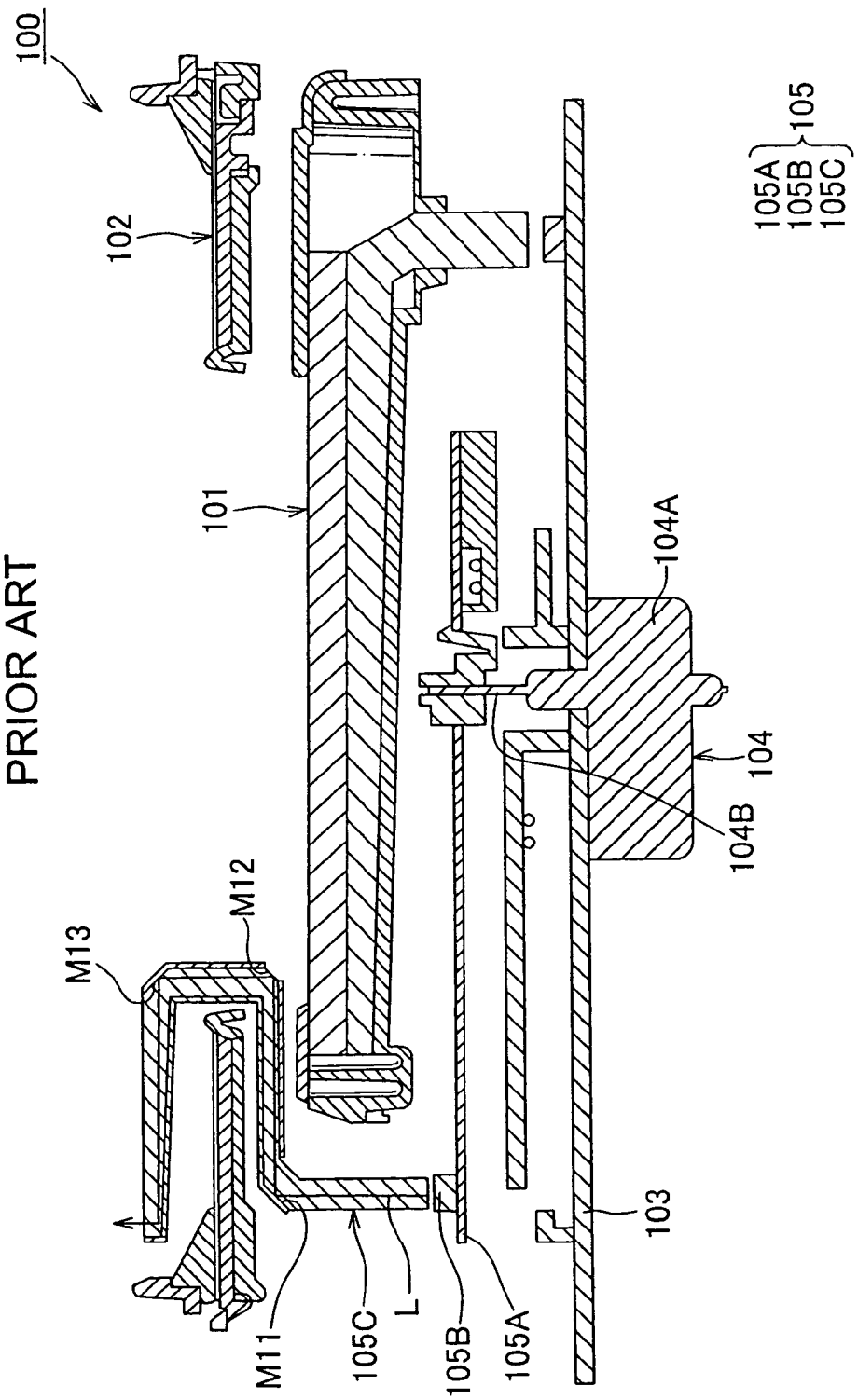
FIG. 8 is a sectional view showing an example of a conventional display device.
Figure 9:
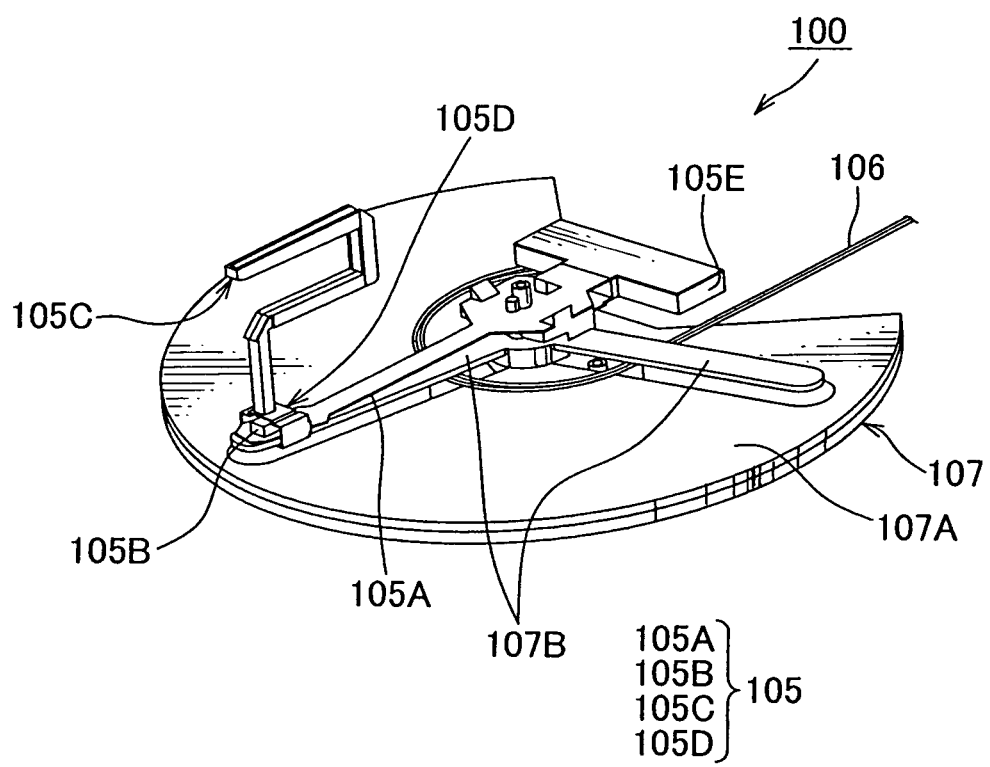
FIG. 9 is a perspective view showing the example of the conventional display device.

Further, according to the above-described embodiment, the meter pointer 12 is composed as shown in FIGS. 1 to 4. However, the present invention is not limited to this. All that is required is that the meter pointer 12 is composed of the light guiding pointer main body 20, the LED light source 19 for illuminating the pointer main body 20, and the base plate 18 on which the LED light source 19 is mounted, and the motor rotates the pointer main body 20, the LED light source 19 and the base plate 18. For example, the meter pointer 12 may have a structure shown in FIGS. 7 and 8.

Further, according to the above-described embodiment, the FPC 13 is used as the electric wire connecting the main substrate 10 and the base plate 18. However, the present invention is not limited to this. For example, FFC (Flexible Flat Cable) may be used as long as the electric wire is composed of a flat circuit body.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A meter pointer device comprising:
a meter pointer having a light guiding pointer main body, a light source to emit light to the pointer main body for illuminating the pointer main body, and a base plate on which the light source is mounted;
a motor for rotating the meter pointer;
a main substrate disposed on a rear wall of the meter pointer and on which the motor is mounted;
an electric wire for connecting the base plate with the main substrate, the electric wire being composed of a flat circuit body, and one end of the flat circuit body being connected to the main substrate via a first connection portion in a manner that a width direction of the flat circuit body is perpendicular to the main substrate; and
a circular protecting member having an opening and disposed on the main substrate for surrounding a moving range on the flat circuit body on the main substrate due to a rotation of the meter pointer.

2. The meter pointer device as claimed in claim 1,
wherein a first connecting portion for connecting to the main substrate is provided on one end in the width direction of the one end of the flat circuit body, and
wherein a projection projected toward the other end in the width direction and a second connecting portion formed on an end in a projecting direction of the projection for connecting to the base plate are provided on the other end of the flat circuit body.

3. The meter pointer device as claimed in claim 1,
wherein the other end of the flat circuit body is overlapped with one side wall in a thickness direction of the base plate and electrically connected to the base plate, and
wherein a continuous portion from the other end of the flat circuit body is overlapped with one side wall in a width direction of the base plate and the other side wall in a thickness direction of the base plate, and wound around them.

* * * * *